United States Patent [19]

Hassencahl et al.

[11] 3,886,461
[45] May 27, 1975

[54] MISSILE RADAR DOPPLER PROCESSING UNIT

[75] Inventors: Lloyd J. Hassencahl, Northridge; Leon Chernick, Los Angeles; James N. Jonokuchi, Chatsworth; Joel Katz, Los Angeles; Richard L. Wooley, Canoga Park, all of Calif.

[73] Assignee: The United States of America as represented by the Secretary of the Navy, Washington, D.C.

[22] Filed: Feb. 28, 1972

[21] Appl. No.: 230,542

[52] U.S. Cl. .............. 328/140; 324/78 D; 343/7 A; 343/8
[51] Int. Cl. ..................... G01r 23/02; G01s 9/44
[58] Field of Search ..................... 343/5 DP, 7 A, 8; 324/78 D; 328/140

[56] References Cited
UNITED STATES PATENTS
3,633,173  1/1972  Edge ............................ 343/5 DP X

*Primary Examiner*—T. H. Tubbesing
*Attorney, Agent, or Firm*—Richard S. Sciascia; Ervin F. Johnston; William T. Skeer

[57] ABSTRACT

A signal processor for an echo tracking system is disclosed. A circuit for storing zero signal crossings signal data is connected to read out circuitry to read out the stored signal in either real or compressed time. A controlled local oscillator processes the signals to pass through a single set of filters. The selection of operational mode is controlled by logic circuitry connected to receive the processed signal as well as command signals.

10 Claims, 4 Drawing Figures

MISSILE RADAR DOPPLER PROCESSING UNIT

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of electronic data processing. More particularly, but not by way of limitation, the invention pertains to the field of processing electronic guidance data. In still greater particularity, the invention pertains to a doppler radar guidance system for rocket vehicles and provides an improved data processing channel therefor.

DESCRIPTION OF THE PRIOR ART

Prior art doppler radar systems employed a large number of narrow band signal processing channels. Each such channel included a set of narrow band filters. Three filters per channel are customarily employed and, quite naturally, must be matched with considerable precision. Likewise, it will be obvious to persons versed in the art that individual filter sets require supporting circuitry. For example, in a typical embodiment each filter set includes a buffer amplifier input, a limiter, a phase detector, two post-detection integrator circuits, and an output buffer amplifier associated with each post-detection integrator. As the requirement for increased doppler bandwidth has grown and the resolution requirements increased, the complexity of the system has increased greatly. Of course, the cost and size have increased correspondingly. An example of one such doppler radar system is shown and described in U.S. Pat. No. 3,223,997 to James O. Clark, et al., for "Doppler Correction in a Frequency Diversity Frequency Jittered Pulse Doppler Radar by Means of Digital Phase Computation" issued Dec. 14, 1965.

SUMMARY OF THE INVENTION

This invention uses a triggered multivibrator to produce a digital output signal corresponding to the threshold crossings of the analog signal present in the intermediate frequency amplifier channel of the radar receiver. The digitized signals corresponding to the zero crossing times of the analog signal are stored in suitable memory circuits connected to the multivibrator. The stored signals may be read out in either real time or in compressed time. The choice between real time and compressed time is controlled by means of logic circuitry in dependence on whether target velocity or angle data is to be utilized.

Another feature of the present invention is the elimination of plural channel filters without loss of resolution. This highly desirable feature is accomplished by use of a mixer and voltage controlled oscillator. The mixer receives the signals from the readout circuitry and beats the signal with a local oscillator which is voltage controlled. The voltage applied to the local oscillator is controlled to step different, adjacent frequency bands through a single band pass channel.

In view of the foregoing description of the prior art, it is an object of this invention to provide an improved radar signal processing system.

A further object of the present invention is to provide a radar signal processing circuit which permits narrow band doppler detection of objects and angle tracking thereof from the same signal input.

Another object of the present invention is to provide a data processing circuit for a radar system which synchronizes data processing functions with target illumination.

Another object of the invention is to provide a signal processing circuit having fast response times in conjunction with continuous tracking modes.

Another object of this invention is to provide a doppler radar signal processing circuit of low mass and volume and of moderate cost.

A still further object of the invention is the provision of a signal processing circuit for rocket vehicle guidance having improved circuitry for angular tracking data and velocity data.

These and other objects of the invention will become more readily apparent from the ensuing specification when taken with the drawings.

DESCRIPTION OF THE PREFERRED EMBODIMENT

Figure 1:
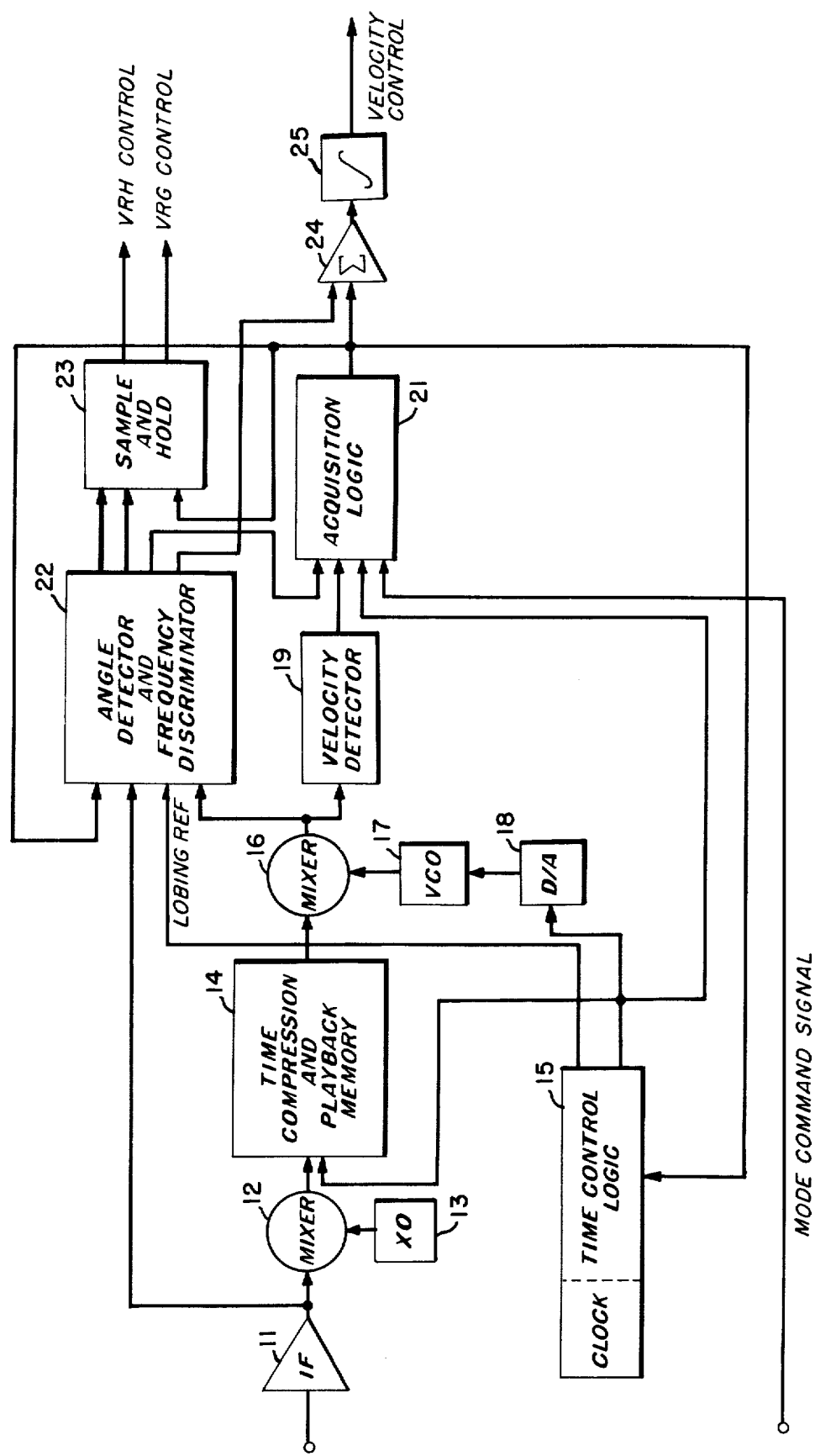
FIG. 1 is a block diagram of the circuit of the invention.

Referring to FIG. 1, IF amplifier 11 is shown as being connected to mixer 12. IF amplifier 11 is a conventional radar circuit and, accordingly, need not be further explained herein. Likewise, any suitable frequency may be employed as an intermediate frequency in the invention. However, for purposes of completeness, it should be noted that a conventional three megahertz intermediate frequency has proven satisfactory. A crystal oscillator 13 is connected to mixer 12 and provides a suitable heterodyne frequency to beat the high signals down in frequency.

In the incident invention the signal at the input to IF amplifier 11 consists of a frequency modulated (FM) carrier. This data is stored in memory unit 14 at a high sampling rate as a single bit per sample quantity. The storing of this data in wide band widths requires high sampling rates. For example, a 50 kilohertz band width requires a sampling rate on order of 1 megahertz.

Crystal oscillator 13 and mixer 12, termed a readin mixer in the art, are employed to beat the IF signal down such that the lower end of the signal band, i.e., the first sideband of the FM signal is placed above the DC potential (i.e., above zero hertz). Because these techniques of frequency selection to provide proper heterodyning without spectrum foldover are well understood in the art, further description is not necessary. In the present application of the invention a 6 kilohertz acquisition band is required. The first sidebands of the FM input signal are located approximately 20 kilohertz above and below the carrier frequency. These considerations result in a band width of the input signal of approximately 46 kilohertz and a correspondingly high sampling rate, as discussed above.

A time compression and playback memory unit 14 is connected to receive the output of readin mixer 12. A variety of memory units suitable for use in this invention are known in the art and selection as between them is considered a matter of choice to a proficient artist. However, a suitable design will be explained in greater detail herein. It should be noted, however, that a hard limiter is incorporated in the playback to digitize the output of mixer 12 so as to utilize only the zero crossing information.

Time compression memories are well known in radar circuitry. By observing a history of a target, considerable information may be obtained regarding the target's speed, course and other useful guidance information. By reading out the data stored in memory 14 at a rate substantially greater than the read in rate, it is possible to examine the signal many times before it is necessary to clear memory unit 14 for new information. Therefore, this invention provides the means for employing a singular narrow band doppler filter to examine wide band data. By selection of the readin and readout rates, the processing bandwidth can be chosen to suit the needs of the system employing this invention. In one particular guidance system containing the embodiment of this invention a ratio of 20 to 1 is used. For a more complete understanding of time compression memories, standard works of the prior art should be consulted. One such work, for example, is U.S. Pat. No. 3,183,505 for "Electronic Time Compression System" granted on May 11, 1965 to Howard J. Strauss.

Time control logic circuit 15 is connected to time compression and playback memory 14 and controls the sampling rate and playback rate thereof. As will be well understood, time control and logic circuitry includes a master clock which controls the overall operation of the system and insures synchronous operation of the respective system components. Since the units are conventional of themselves and since a variety are arrangements will perform the desired logic functions, the detailed disclosure thereof is not necessary for the complete understanding of Applicants' invention. Accordingly, the particular configuration of the logic subcomponents of time control logic circuit 15 are not shown herein.

As previously noted, prior art arrangements used a plurality of filters to detect doppler shifts and the output of the signals. The present invention uses a readout mixer 16 connected to time compression and playback memory 14 to step the frequency of the output signals through a narrow band region covered by a single velocity acquisition filter, as will be made clear herein. The heterodyning frequency is supplied to mixer 16 by a voltage control oscillator 17 which is connected thereto. In turn, the voltages necessary to sweep voltage control oscillator 17 through the increments of this required spectrum are supplied by an attached digital-to-analog converter 18. Digital-to-analog converter 18 is connected to time control logic 15 for receipt of digital signals. It will be obvious that the number of increments into which the doppler bandwidth may be broken is determined by the time compression of time compression and playback memory 14.

A velocity filter 19 is connected to mixer 16 in order to receive the output thereof. An acquisition logic circuit 21 is connected to velocity detector 19 and receives the detected output signal therefrom. When a predetermined signal has been detected by velocity detector 19, acquisition logic 21 produces an output which is coupled to the angle detector 22. Another output from acquisition logic circuit 21 is coupled back to time control logic circuit 15. Analog outputs from acquisition logic circuit 21 and frequency discriminator 22 are fed to summing amplifier 24. The functions of these outputs will be more fully described herein. An integrator 25 is connected to summing amplifier 24 to form a rate feedback control loop. The output from integrator 25 is fed to suitable frequency control circuitry as in prior guidance systems.

Like time control logic circuit 15, acquisition logic circuit 21 is not shown in detail herein. A variety of arrangements of conventional logic circuit units will suffice to perform the logic functions required of acquisition logic circuit 21. Therefore, it is not believed necessary that a particular embodiment is shown in detail for the full understanding of Applicants' invention.

When acquisition logic circuit 21 indicates that a target of interest is present and has been processed, the angle detector circuit 22 is enabled by means of a gate to receive the angle processing information. The data which has been recirculated for velocity processing is now used to process angle information. Logic circuit 21 also provides a pulse output to time and logic circuit 15 which in turn controls the time compression and memory circuit such that the target information is read out in real time as opposed to compressed time. If no on-target signal occurs, of course, no signal is sent to the angle processing circuits. If, however, a target signal is present the stored multiplexed signal is sent from the readout mixer 16 to the angle detection circuit 22. The output of angle detection circuit 22 is processed through suitable limiting and discriminator circuits to be more completely described herein, and sent to sample and hold circuit 23.

Sample and hold circuit 23 is a conventional state of the art circuit. It functions to hold angular information in polar coordinates until the information is used for the required guidance purposes. It is triggered by acquisition logic circuit 21 connected thereto. However, if the signals supplied angle detector circuit 22 exceed the requirements of an associated gate circuit, the sample and hold circuit 23 is inhibited. In such an instance, the frequency position stored in the acquisition logic circuit 21 is advanced to next highest threshold position and the information stored in the time compression and playback circuit 14 is again supplied to angle detector 22 for further processing.

This further processing comprises a second attempt to process angle information using another target position. This automatic process is made possible because the information is still available to the processing circuit from the storage and memory circuit 14.

Figure 2:
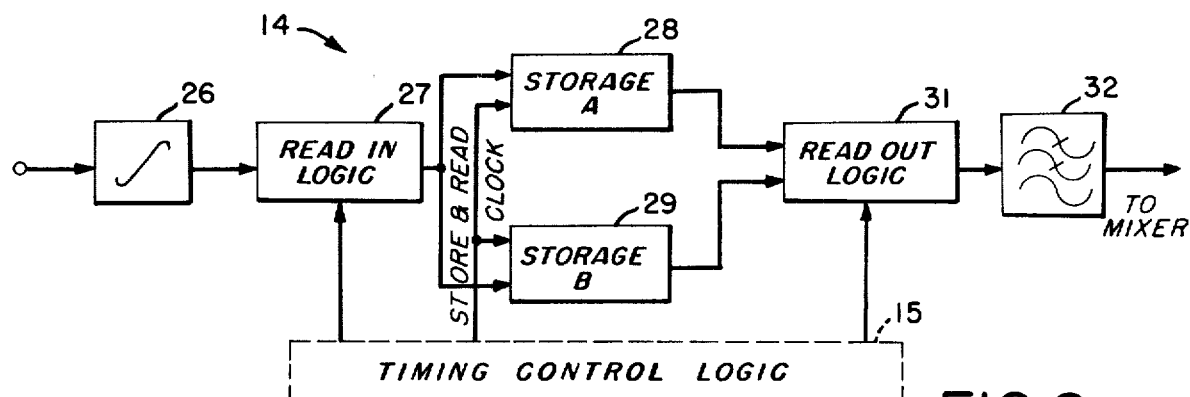
FIG. 2 is a block diagram of the time compression and playback memory component of the circuit of FIG. 1.

As noted previously, a variety of memory units may be used for time compression and playback memory 14. However, for purposes of completeness, an exemplary arrangement is shown in FIG. 2. The input signal from mixer 12 is fed to a hard limiter 26. Suitable readin logic circuit 27 is connected to hard limiter 26 to receive the signals therefrom. Two storage units 28 and 29 are connected to readin logic circuit 27. Two storage units 28 and 29 are arranged such that they may be connected in either series or time parallel by readin and logic circuit 27. A cooperating readout logic 31 is similarly keyed such that storage units 28 and 29 may be used either in series or parallel. That is, storage unit 28 may be used to readin information at the same time storage unit 29 is used to readout previously stored information. On the other hand, readin and logic circuit 27 and readout logic circuit 31 may be keyed by timing control logic 15 such that storage unit A is filled in a readin mode and then storage unit B is sequentially filled in a readin mode. Similarly, information may be read from the units in the same fashion. A low pass filter 32 is connected to readout logic circuit 31 to remove extraneous signals prior to feeding the signal to mixer 16.

It may be seen that the parallel use of storage registers 28 and 29, which the purposes of illustration may be regarded as shift registers, an improved data response time is obtained. In the terminal guidance mode, a rapid update rate is desirable in angle tracking because excessive delays introduce noise in the angle tracking servo system. Thus, angle information may be processed continually without the introduction of excessive noise. The advantages of a rapid update are obvious in a missile guidance system.

Figure 3:
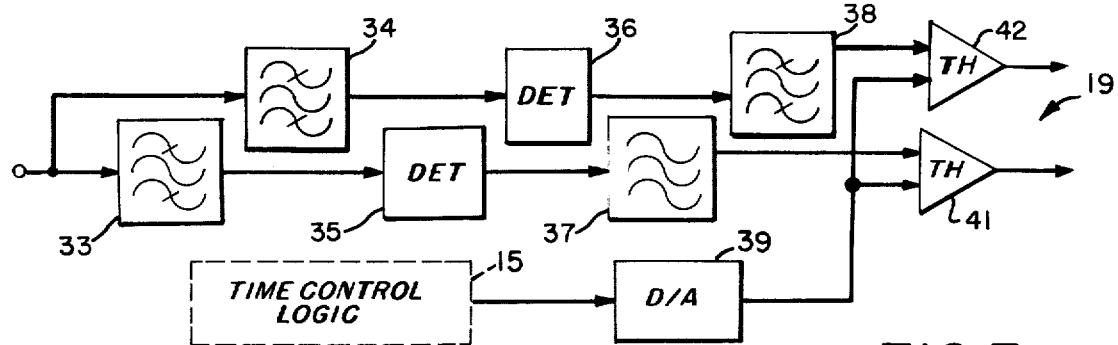
FIG. 3 is a block diagram of the velocity detector component of the circuit of FIG. 1.

Referring now to FIG. 3, an arrangement of standard state of the art components suitable for velocity detector 19 will be described. Suitable band pass filters 33 and 34 are connected to readout mixer 16 so as to receive the output thereof. Suitable envelope detectors 35 and 36 are connected to band pass filters and 33 and 34 respectively. Envelope detectors 35 and 36 provide an output when a digital target signal is in the band pass of their associated band pass filter. If desired, the outputs from detectors 35 and 36 may be filtered by post detection filters 37 and 38. The output from filters 37 and 38 together with an analog voltage derived by digital to analog converter 39 are through fed to threshold amplifiers 41 and 42. Digital to analog converter 39 is, in turn, connected to time control logic 15 which supplies the digital signals to establish the threshold for threshold amplifiers 41 and 42. Although other detector arrangements may obviously be used, the illustrated arrangement has proven satisfactory in development models of the system of the invention.

Figure 4:
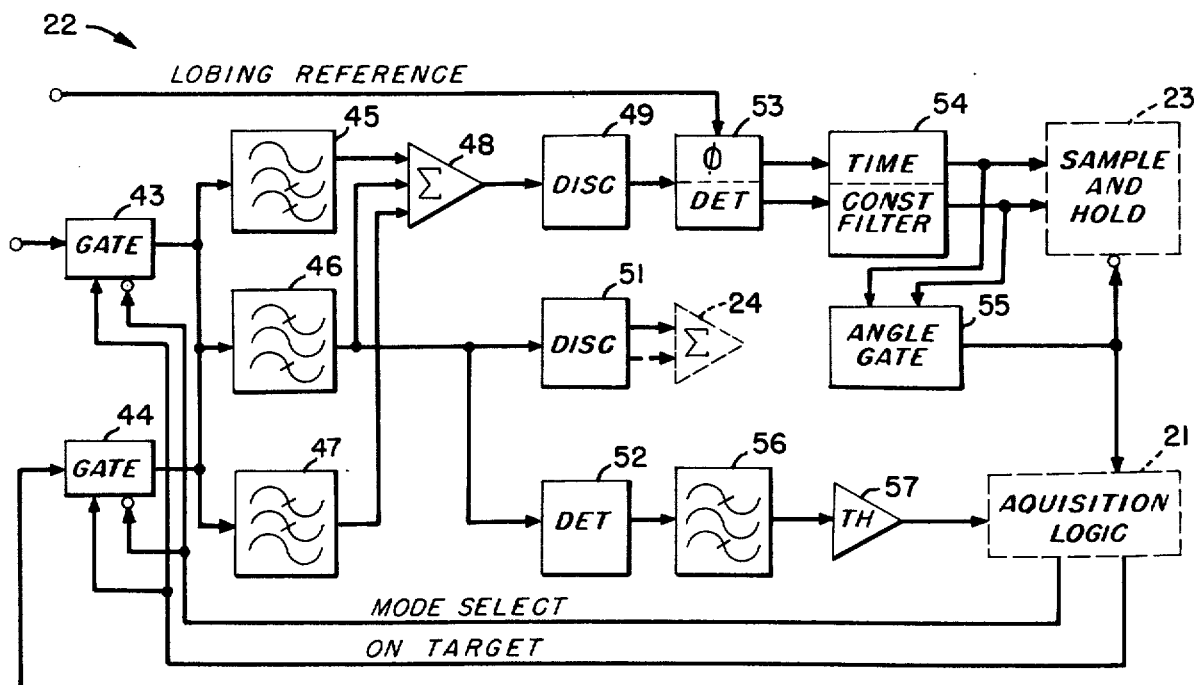
FIG. 4 is a block diagram of the angle detector and velocity discriminator component of the circuit of FIG. 1.

Referring to FIG. 4, an arrangement of conventional components as comprising previously discussed angle detector 22. Two input gates 43 and 44 of suitable construction are shown as being controlled by acquisition logic circuit 21. Gate 43 gates the signal from IF 11 prior to being stored in time compression and memory playback 14 for real time processing while gate circuit 44 gates the output of mixer 16 for processing by angle detector circuit 22. This arrangement permits the circuitry of the invention to function in different modes of operation, a valuable feature of the invention which will be more fully described presently. Three band pass filters 45, 46, and 47 receive the input for the angle gate in dependence on whether gate 43 for 44 is activated. The conditions determining which gate is activated will also be explained herein. The output of band pass filters 45, 46, and 47 are summed by summing amplifier 48 connected thereto. A discriminator circuit 49 is connected to summing amplifier 48 and detects the FM modulation (angle tracking error) on the output thereof. The output of band pass filter 46 is discriminated by discriminator circuit 51 connected thereto to form the fine tuned velocity error. As previously noted in connection with FIG. 1, the velocity error is passed to summing amplifier 24. The output of band pass filter 46 is also enveloped detected by detector 52 attached thereto.

Phase detector 53 contains two phase detector circuits, indicated by broken lines. Phase detector 53 is connected to receive the output signals from discriminator 49 and compares these signals in phase with the quadrature reference signals from timing control logic circuit 15. These quadrature reference signals, termed lobing reference signals in the art, originate in the master timer, as shown in FIG. 1.

A filter 54 is connected to phase detector 53 and further processes the output thereof and supplies it to an angle gate 55. Filter 54 is the angle detector time constant filter and, like phase detector 53, comprises two circuits. As previously noted, the output of filter 54 is read to a sample and hold circuit 23 which is connected thereto. Sample and hold circuit 23 is activated when the requirements of angle gate 55 have been satisfied, that is, when the target is within certain predetermined angular limits. In the data sampling mode, no further angle processing is required until the next cycle, or until the load select switch goes to an active mode as will be presently explained.

The enabling of the sample and hold circuit 23 is also controlled by a detector circuit 52. A filter 56 connected to the output of detector filter of detector 52 processes the signal detected thereby and applies it to a connected threshold circuit 57. As shown, the output of threshold amplifier 57 is applied to acquisition logic circuit 21. As will be readily understood, this threshold arrangement enables the angle sample and hold circuit 23 to be activated at at time when the output of the phase detector filter 54 is at its maximum value.

Although the foregoing description of Applicants' invention will enable one versed in the electronic arts to make the Applicants's system, the invention will be better understood with reference to the following description of the mode of operation.

Mode of Operation

Although not limited thereto, the invention will be described as it applies to a guidance data system for a rocket vehicle having a radar input. As previously described, the multitude of angle processing and velocity acquisition circuits required in the all analog processors prior art are replaced by the aforedescribed mixers, switches, digital to analog converters and storage units. The digital processor, of course, replaces the conventional parallel filter processors and permits the serial processing of the data. This data (the sum and difference signals) is in the form of a narrowband FM modulated carrier (the result of an FM multiplex process implemented in the radar receiver). The data is sampled and stored during the period that the target is illuminated. The sampled and stored data is then processed during the time between illumination cycles. One specific implementation of this system has an information bandwidth of the order of 50 kilohertz and requires a high sampling rate of the order of 350 kilohertz to later recover the phase of the FM modulation with good fidelity. The signal is beat down in frequency by means of mixer 12 and oscillator 13. The frequency of the beating oscillator 13 is chosen such that the second harmonic of the lowest frequency in the information band is of the order of five times the information bandwidth.

Hard limiter 26, a component of time compression and playback memory 14, converts the multiplexed analog signal to a square wave so as to place the signal in digital form. Sampling of this square wave signal is accomplished with the storage shift registers 28 and 29 at the readin clock frequency. The size and speed of these storage units are related to the sampling rate and the signal interrogation time. For a sampled data mode, the integration time is equal to a predetermined interval of time, termed key-on duration. Therefore, the total number of bits stored is the product of the duration of this time multiplied by the clock frequency. This number, of course, represents the sum of the storage capabilities of storage registers 28 and 29. Therefore, in this sampled data mode, storage registers 28 and 29 are used sequentially. Practical considerations dictate a key-on time of 50 milliseconds which requires approximately 17 times $10^3$ bits of storage capability for the two storage units. This is well within the capabilities of present state of the art MOS-FET storage registers. Although other integration intervals may be used, the 50 millisecond time has proven optimum in the case of the disclosed system.

Since, as previously explained, the velocity data is processed serially, it is necessary to cycle the storage units the same number of times as there are narrow band regions to be examined. To accomplish this within a chosen time, the readout clock frequency must be that number times the readin frequency. The placing of storage units 28 and 29 in serial readin and readout, as well as the readin and readout frequencies, is controlled by timing and logic circuit 15 as it was explained in connection with FIG. 2. That is, data is read in in synchronism with key on or integration signal. The data readout is low pass filtered by low pass filter 32 before being applied to mixer 16.

The readout mixer 16 steps the frequency of the storage output signal through the narrow band regions covered by velocity acquisition filter 33. Frequency multiplication of the original data is equal in number to the number of narrow band regions investigated. Since one velocity filter is employed the system of the invention is equivalent to a prior art system having the same number of narrow band filters as are narrow band regions examined by this system.

The number of narrow band regions to be examined is obviously limited by the state of the art of the shift registers and the frequency at which they must be clocked. As the electronic art is developed, this frequency is being continually revised upwardly and presently capabilities in excess of 10 megahertz are now available. However, storage units which have a much more moderate clocking requirement have proven quite satisfactory in the system of the invention.

The outputs of velocity filter 33 is enveloped detected by detector 35 and filtered by filter 37. The effective post detection filter time constant is 20 times the actual filter time constant. The detected signals are then applied to threshold amplifier 41. The reference input to threshold amplifier 41 may be stepped at a high rate by digital to analog converter 39. Such an arrangement provides each threshold to be equivalent to several thresholds as provided in step increments by digital-to-analog converter 39. In developmental models, it has been found that four reference steps are usually sufficient to provide a detection equivalent to the prior art mean level detector schemes.

The output of threshold amplifier 41 is applied to acquisition logic circuit 21. Acquisition logic circuit 21 sorts the threshold crossing signals in order of their reference level and by the stepped VCO frequency applied to mixer 16 by VCO 17. If more than one velocity filter position provides a threshold crossing, the one with the highest reference level crossing is taken as the target signal. In the system of the invention, as in the prior art systems, the desired signal is initially centered during a prelaunch period. Alternatively, the desired signal may have been detected and centered during the prior integration cycle.

The frequency position of the centered signal and crossing level information is stored in the acquisition logic. The frequency position is, dependent upon the doppler shift between the initially centered position and the detected position. This shift is caused by speed differences between the target and the vehicle. If a target detection meeting the predetermined criteria is obtained, an "on-target" signal is generated by acquisition logic circuit 21.

As shown in FIG. 4, this "on-target" signal is applied to gates 43 and 44 in the angle detector circuit configuration. The on-target signal is generated at the end of the velocity processing time, that is, approximately 100 milliseconds after the key on is initiated.

The "on-target" signal is also applied to time control logic circuit 15 which, in response thereto, holds the readout voltage control oscillator 17 at the frequency position of the detected signal. Consequently, the signal appearing at the readout mixer 16 is held at the nominal center frequency position. The stored data, which has been circulated for velocity processing, is next used to process angle information.

The timing control logic circuit 15 in response to the "on-target" signal also changes the readout clock frequency to be the same as the readin frequency. As a result, the stored data is readout in real time during angle processing as previously mentioned.

As previously noted in connection with the description of FIG. 4, the stored multiplex signal is sent from the readout mixer via gate 44 to the three band pass filters 45, 46, and 47. The filters are positioned about the center position of the frequency of the data band passing into storage and they receive the velocity centered signal therein. The outputs of angle filters 45, 46, and 47 are summed by summing amplifier 48, passed through a limiter and discriminated by discriminator 49 before being sent to the phase detector as previously described.

Only one set of angle filters is needed because the signal data that is stored during velocity processing becomes available again due to the playback feature of the memory. The bandwidth of the angle filter must be wider than that of the velocity filter because the velocity filters are used to center the signal within the angle filters. A ratio of 1½ to 1 has proven satisfactory although is some applications a ratio of 2 to 1 may be required. The output of filter 46 is detected and filtered by detector 52 and filter 56 and applied to the threshold amplifier 57. As previously noted, threshold amplifier 57, via acquisition logic circuit 21, enables sample and hold circuit 23 at a time when the output of the filter 54 is at a maximum.

The output of the angle discriminator is, of course, the angle subcarriers which were initially multiplexed in the receiver preamplifier. The angle signal is demodulated in phase detector 53 by comparison with quadrature components of the lobing reference frequency supplied by timing control logic circuit 15. In a typical system, this frequency is approximately 20 kilohertz. The output of each phase detector is filtered by phase detector time constant filter 54 and applied to sample and hold circuit 23. Sample and hold circuit 23, of course, provides the voltage output in reference to the angular coordinates of the target.

It should be noted that the lobing reference signal must be derived within the timing control logic so as to be in synchronism with the storage and timing sequence. This avoids any loss of phasing reference due to delay of the serial storage method of data processing therein. The amount of delay must also be an integral multiple of the period of the lobing reference to preserve phase coherence through the storage units.

If the phase detector time constant filter voltages meet the criteria of angle gate circuit 55, they are stored in sample and hold circuit 23 as noted above. In this mode of operation, no further angle processing is required until the next integration, or until the mode select switch is to an active mode as will be presently explained. However, if the angle gate requirements are exceeded, the sample and hold circuit is inhibited. Also, the frequency positions stored in the acquisition and logic circuits 21 are switched to the threshold crossing position having the next highest value.

In such circumstances, a second attempt is made to process angle information using another possible target position. This unique feature is possible in Applicants' system since the information is still available in the storage unit. If on the second attempt angle gate voltage requirements are not exceeded, the sample and hold the circuit 23 stores the appropriate angular indication voltages. Although the system employing the invention has time for only two attempts to process angle information, other applications may permit further processing.

In the preferred embodiment at the end of the second angle playback period, assuming no angle gating is obtained, the acquisition logic sends an error correcting voltage to the voltage controlled local oscillator input. This signal recenters the signal within the IF pass band. If the angle gate is exceeded twice, no velocity correction is sent to the voltage controlled local oscillator. Of course, if the first angle readout is valid, then the voltage controlled local oscillator frequency is changed so as to recenter the signal at the end of the first angle readout.

This concludes the description of Applicants' processing system in the sample data mode. However, another mode of operation is possible by reprogramming acquisition logic circuit 21 by means of a mode command signal, the input for which is shown in FIG. 1. This increased flexibility is due to the unique nature of Applicants' time compression and playback memory arrangement shown in FIG. 2. It will now be described.

When desired, the system of Applicants' invention may be operated in an active mode. When in this mode, the timing logic connects storage units 28 and 29 in a push-pull arrangement. In this arrangement the number of bits of information stored are but half that in the sample data mode of operation. Also, angle information is inhibited from the readout mixer and is taken directly from the readin mixer output, thereby, bypassing the time compression and playback circuit 14.

In the active mode, the digital processor is connected differently to provide a faster velocity detection. In this mode shift registers 28 and 29 are connected to form two push-pull registers. In this active mode and with the radar receiver on, the limiter output is sampled and the resulting pulse train stored in shift register 28 or 29 alternately. As data is being stored in one register, data in the other register is being readout. In this fashion, although the storage capability of each individual register is limited, continuous processing is possible. The input sampling rate in the acquisition circuit and the velocity tracking and readout rates remain the same in this mode as in the previously described sampling mode.

The faster response time is required in the active mode because the angle error information bypasses the digital processor and is processed continuously. Excessive delay in detecting the target both reduces the available time for tracking and introduces noise in the angle tracking servo. The disclosed circuit configuration minimizes processor modifications when switching from the sample data mode to continuous mode and still retains a reasonably fast response time for the target signal. Equivalent time delay for an analog processor is approximately 22 milliseconds. Because the digital processor time delay is approximately twice the input data sample length, the delay can be reduced by shortening the input sample. However, for practicable applications the sample length is never reduced significantly below 25 milliseconds. Reductions below this level give rise to complications in processing the signal.

In an exemplary construction target duration in the sample data mode is 25 milliseconds and the processing time constants are matched for both active and sample data modes of operation. If continuous sample length is significantly reduced, the processor time constants must also be reduced and some loss of detection probability may occur. Thus, as in all such systems, the trade off between the response time, detection probability, and hardware complexity must be made to determine optimum system perameters. However, the disclosed system parameters provide reasonable results.

When in the continuous mode and a target is detected, an error signal is sent to a velocity tracker to center the target in the filter bank. Also, the front end filter bandwidth is changed to narrow it somewhat. If the target is confirmed, the "on-target" signal generated by acquisition logic 21 closes both the angle detector and velocity tracking loops. The velocity tracking in this mode uses an analog discriminator 51 operating on the output of the subchannel filter 46 of the angle tracker. The circuit connections for this circuitry were partly described in connection with FIG. 4 above.

An obvious advantage of the velocity tracking system of the invention is that the analog control may be made with very low gain. This low gain reduces the susceptability of a type of countermeasure known as velocity gate stealers. As previously mentioned, the signal for the angle tracker circuit 22 bypasses the digital processor in this mode. However, the same angle resolving circuits are used for both sample data and continuous tracking modes.

The foregoing description covers only the digital signal processing components of the total guidance system. It should be obvious that the control functions of the prior art systems function in the same way when the data processor of the invention is incorporated into the system as they did in the all analog processors of the prior art. Thus, the guidance hardware and target selection logic remain unchanged over prior systems, a considerable economy.

The foregoing description taken together with the appended claims constitute a disclosure such as to enable persons skilled in the electronics and missile guidance arts and having the benefit of the teachings contained therein to make and use the invention. Further, the structure herein described meets the objects of the invention, and generally constitutes a meritorous advance in the art unobvious to such skilled workers not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. A data processing system comprising:
   amplifier means for increasing the power of an electrical signal having predetermined frequency characteristics;
   oscillator means for generating an electrical signal of a predetermined frequency;
   first mixer means connected to said amplifier means and to said oscillator means for producing an electrical signal having a frequency content including the sum and difference of said amplified signal and said oscillator frequency;
   time compression and playback means connected to said mixer means for the storage and accelerated reproduction of signals from said first mixer means;
   second mixer means effectively connected to said time compression and expansion means for receipt of the signal output therefrom;
   voltage controlled oscillator means connected to said second mixer means for supplying a heterodyne signal therefor;
   first detection means connected to said second mixer means for detection of electrical signals having predetermined characteristics;
   second detection means connected ahead of said first mixer means and to said second mixer means via first and second gate means respectively;
   logic circuit means connected to said first and second detection means for receipt of said detected output signals therefrom and connected gate means for control of signals applied to said second detector means in response to the detection of a predetermined signal by said first detection means; and
   timing control logic means including master clock means effectively connected to said time compression and playback means, said voltage controlled oscillator means, the gate means of said second detector means, and said logic circuit means for the timely and synchronous control thereof.

2. A data processing system according to claim 1 in which time compression and playback means includes:
   readin circuit means effectively connected to said first mixer means for processing signals applied thereto and connected to said timing control logic means for timely activation thereby;
   storage means connected to said readin circuit means for recording signals processed thereby and connected to said timing control logic means for timely activation thereby; and
   readout circuit means connected to said storage means for recovery of signals stored therein and connected to said timing control logic means for timely activation thereby.

3. A data processing system according to claim 2 in which the storage means includes two shift registers connected in a manner to be selectively placed in series circuit configuration or in parallel circuit configuration.

4. A data processing system according to claim 1 in which said effective connection between said voltage controlled oscillator and said timing control logic means includes a digital-to-analog converter circuit effective to cause said voltage controlled oscillator to sweep a predetermined range of frequencies.

5. A data processing system according to claim 1 in which said first detection means includes:
   a band pass filter connected to said second mixer means to filter the output thereof;
   envelope detector means connected to said band pass filter for producing output signals in response to amplitude variation in said filtered signal; and
   threshold amplifier means effectively connected to said envelope detector means for producing a signal when said detected output signal exceeds a predetermined value.

6. A data processing system according to claim 5 including digital-to-analog converter means connected between said threshold amplifier means and the aforesaid timing control logic means and effective to establish the predetermined threshold value in response to digital signals supplied thereto.

7. A data processing system according to claim 1 in which said second detector includes:
   a plurality of band pass filters connected in a parallel relationship and connected to said second mixer;
   first summing amplifier means connected to said plurality of band pass filter means for combining the outputs thereof into a single signal channel;
   a discriminator means effectively connected to said first summing amplifier means and connected to a phase detector; and
   a phase detector means effectively connected to said discriminator and connected to the aforesaid timing control logic means for detecting signals having predetermined relationship with regularly occurring timing signals.

8. A data processing system according to claim 7 further including discriminator means connected to one of said plurality of band pass filters for providing a second output from said second detector means.

9. A data processing system according to claim 8 further including second summing amplifier means connected to said discriminator means and effectively connected to the aforesaid first detector means, via the aforesaid logic circuit means, for providing a common output channel therefor.

10. A data processing system according to claim 7 further including:
    third detector means connected to one of said plurality of band pass filters for amplitude detection of the signals passed thereby; and
    threshold amplifier means effectively connected between the third detector means and the aforesaid logic circuit means for providing an output when signals from said third detector exceed a predetermined value.

* * * * *